United States Patent [19]

Hiromichi

[11] Patent Number: 5,257,574
[45] Date of Patent: Nov. 2, 1993

[54] COFFEE BEAN ROASTING DEVICE

[76] Inventor: Toriba Hiromichi, c/o Kabushiki Kaisha Doutor Coffee, 3-17-7, Shibaura, Minato-ku, Tokyo 108, Japan

[21] Appl. No.: 730,815
[22] PCT Filed: Dec. 20, 1990
[86] PCT No.: PCT/JP90/01663
  § 371 Date: Jul. 24, 1991
  § 102(e) Date: Jul. 24, 1991
[87] PCT Pub. No.: WO91/09541
  PCT Pub. Date: Jul. 11, 1991

[30] Foreign Application Priority Data

Dec. 21, 1989 [JP] Japan .............................. 1-147185[U]
Dec. 21, 1989 [JP] Japan .................................. 1-331972

[51] Int. Cl.⁵ .............................................. A23B 9/02
[52] U.S. Cl. .......................................... 99/483; 99/331;
  99/468; 34/133 L; 126/21 A; 431/19; 431/20
[58] Field of Search ...................... 99/323.7, 468, 483,
  99/486, 330, 331, 427; 34/15, 51, 133 L, 133 N;
  110/162; 126/21 R, 21 A; 236/15 C; 431/19,
  20, 75; 432/24, 47

[56] References Cited

U.S. PATENT DOCUMENTS

| 2,159,027 | 5/1939 | Jalma et al. ........................ 126/21 A |
| 2,217,518 | 10/1940 | Merkt ................................. 236/15 C |
| 4,197,657 | 4/1980 | Leino et al. ........................... 34/51 |
| 4,570,357 | 2/1986 | Kuboyama ............................. 34/15 |

FOREIGN PATENT DOCUMENTS

| 171522 | 2/1986 | European Pat. Off. .............. 99/330 |
| 2657744 | 6/1978 | Fed. Rep. of Germany ........ 99/427 |
| 270960 | 8/1989 | German Democratic Rep. ... 432/24 |
| 54-145273 | 11/1979 | Japan . |
| 54-44746 | 12/1979 | Japan . |
| 56-19986 | 5/1981 | Japan . |
| 58-2239 | 1/1983 | Japan . |
| 58-33920 | 7/1983 | Japan . |
| 59-200123 | 11/1984 | Japan ................................... 431/19 |
| 59-41989 | 12/1984 | Japan . |
| 57122 | 4/1985 | Japan ................................... 431/19 |
| 63-1838 | 1/1988 | Japan . |
| 61-31981 | 7/1988 | Japan . |

OTHER PUBLICATIONS

English translations of (1) Claims 1 and 2 of Japanese Publication 54-44746 (1 page), and (2) Claims 1-3 of Japanese Publication 54-145273 (2 pages).
Partial English translations of Japanese Publications 56-19986, 58-2239, 58-33920, 59-41989, 61-31981 and 63-1838 (18 pages).

Primary Examiner—Philip R. Coe
Assistant Examiner—Mark Spisich
Attorney, Agent, or Firm—Flynn, Thiel, Boutell & Tanis

[57] ABSTRACT

A coffee bean roasting device for roasting coffee beans by applying hot air to the coffee beans. The coffee bean roasting device includes a detector for detecting a factor exerting influence upon the roasting state of coffee beans, and a controller for controlling the hot air supplier and/or exhaust discharger in accordance with a detection signal input from the discharger. The controller may be, for example, an electronic control portion such as computer including a pressure sensor for detecting a pressure value of the roasting space as a factor exerting influence upon the roasting state of coffee beans and adapted to record a pressure value input from the pressure sensor in a particular roasting state of coffee beans as a particular pressure value and control the exhaust discharger to regulate the amount of exhaust gas on a basis of the pressure value input from the pressure sensor, such that the pressure value of the roasting space becomes such recorded particular pressure value as a target value.

8 Claims, 6 Drawing Sheets

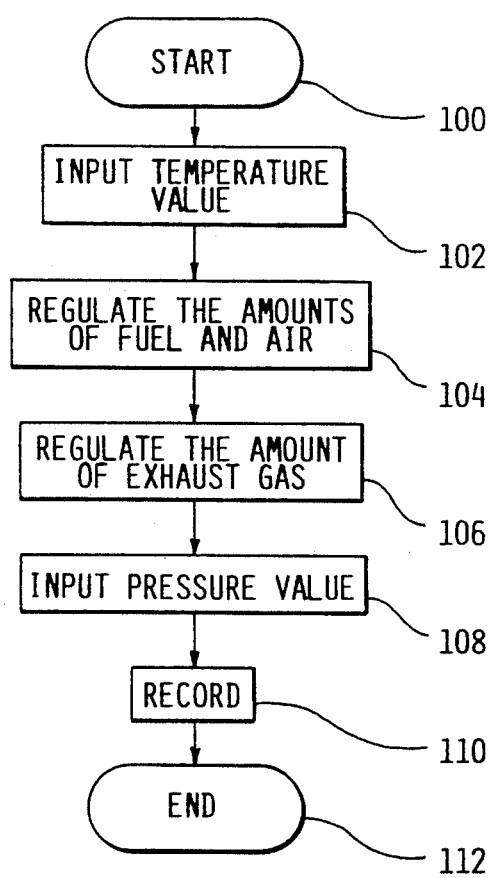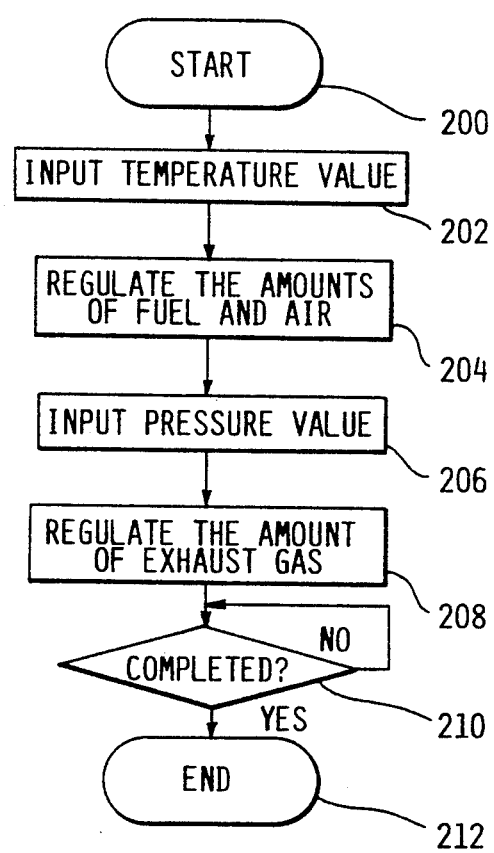

COFFEE BEAN ROASTING DEVICE

FIELD OF THE INVENTION

This invention relates to a coffee bean roasting device, and particularly to a coffee bean roasting device capable of finely adjusting a pressure value of a roasting space, thereby to be able to reproduce a particular roasting state of coffee beans with ease and without a requirement of a high-degree of knowledge and experience.

BACKGROUND OF THE ART

Coffee beans produce colors, taste and smell by roasting. Coffee beans are usually accommodated in a roasting space of a roasting container, and the coffee beans accommodated in the roasting space are roasted with hot air supplied by a hot air supplying means. Exhaust gas generated in the roasting space in the roasting container by roasting the coffee beans is usually discharged by an exhaust gas discharging means. As factors for determining the roasting state of the coffee beans, there can be listed temperature of the roasting space, time for roasting, and the amount of exhaust gas.

More specifically, the color of the coffee beans is gradually changed to a thick color of dark brown from green of raw beans via light brown in accordance with the progress of the roasting process. At that time, the color of the coffee beans becomes darker if the temperature becomes is higher and the time is longer. Likewise the color is lighter if the temperature is lower and the time is shorter. The temperature of this hot air can be adjusted by, for example, a burner, as the hot air supplying means. Also, the color of the coffee beans becomes darker if the amount of exhaust gas is smaller because the coffee beans are smoked. Likewise the color of the coffee beans is lighter if the amount of exhaust gas is larger because they are not smoked. The amount of exhaust gas is adjusted by, for example, an exhaust gas damper as the exhaust gas discharging means.

Devices for controlling the temperature during the time that coffee beans are being roasted, are disclosed in Japanese Patent Publication No. Sho 56-19986 and Japanese Utility Model No. Sho 58-2239 and Japanese Utility Model Publication No. Sho 58-33920. Also, devices for controlling the time, are those disclosed in Japanese Utility Model Publication Nos. Sho 59-41989 and 63-1838. Furthermore, a device for controlling the amount of exhaust gas, is disclosed in Japanese Patent Publication No. Sho 61-31981.

Although the above-mentioned temperature and time are important to the roasting state of the coffee beans, the adjustment of the amount of exhaust gas is also important to it. In other words, if the exhaust damper disposed at the exhaust passage is closed to decrease the amount of exhaust gas, the coffee beans become dark in color because they are smoked, and if the exhaust damper is opened to increase the amount of exhaust gas, they become light in color because they are not smoked. Accordingly, in order to roast the coffee beans to a desired color, the adjustment of the amount of exhaust gas is important.

Also, when the roasting process of the coffee beans has progressed, the central portions of the coffee beans are dilated and the so-called silver skin is discharged. This silver skin is discharged into the exhaust passage from the roasting space by the exhaust gas stream and separated from the exhaust gas by a cyclone as a dust removing device disposed on a downstream side of the exhaust passage.

However, if the amount of exhaust gas is large and the velocity of the exhaust gas stream is fast, the silver skin is not dropped within the cyclone, but instead flows into the after-cyclone stage. In the case just mentioned, if an afterburner is attached to the after-cyclone stage, there is fear that the silver skin may ignite and combust into fire. On the other hand, if the amount of exhaust gas is small and the velocity of the exhaust gas stream is slow, the silver skin cannot be discharged from the roasting space and the taste is deteriorated owing to coexistence of the silver skin with the coffee beans.

In order to roast the coffee beans into desired color and in order to make it possible to discharge the silver skin, the amount of exhaust gas must be adjusted properly.

However, the amount of exhaust gas is changed not only by such factors as temperature of the combustion space, etc. but also by such things as the seasons, weather and the like. If a dust arrester, a deodorizing device or the like is connected to the downstream side of the exhaust passage in order to prevent dust and odor of silver skin, etc. generated by the roasting coffee beans from being discharged, back pressure, which is irregularly changeable, is generated to the exhaust passage by this device. As a result, the amount of exhaust gas is fluctuated by this back pressure irrespective of the fact that the opening- and closing state of the exhaust damper is constant.

Because of the foregoing inconveniences, it was difficult for non-technicians to finely regulate the amount of exhaust gas in order to reproduce a particular roasting state of the coffee beans. A high-degree of knowledge and experience was required for roasting the coffee beans, and it was not an easy job to roast the coffee beans into a particular roasting state.

Through extensive study and experiment, the inventor of this application has found that the pressure value of the roasting space of a roasting container for containing the coffee beans exerts influence on the roasting state of the coffee beans.

This means that the same roasting state can be reproduced by detecting and recording a pressure value of a roasting space as a method for numerically catching the change of the roasting state of the coffee beans caused by such factors as temperature of the roasting space, the amount of exhaust gas, seasons and weather, and regulating the pressure value of subsequent roastings space in the roasting such that the pressure value becomes a recorded pressure value as mentioned above. In other words, by recording a pressure value of a particular roasting state of the coffee beans and regulating the pressure value of the roasting space, the pressure value is adjusted to the recorded pressure value mentioned above. Therefore, a particular roasting state (or identical roasting state) can be produced without a high-degree of knowledge and experience.

Until now, the amount of exhaust gas was adjusted by detecting only the temperature of the hot air and the amount of exhaust gas. Because of this, a fine adjustment of the pressure value of the roasting space was difficult to attain merely by adjusting only the temperature of hot air and the flow rate of exhaust gas, as in the prior art and therefore, the coffee beans were difficult to easily roast into a particular roasting state.

It is therefore an object of the present invention to realize a coffee bean roasting device capable of finely adjusting a pressure value of a roasting space, thereby easily reproducing a particular roasting state of coffee beans without a high-degree of knowledge and experience.

DISCLOSURE OF THE INVENTION

This invention controls, through control means, hot air supplying means and/or exhaust gas discharging means in accordance with outlet signals input from detection means for detecting factors exerting influence on a roasting state of coffee beans. For example, by an electronic control portion, the exhaust gas discharging means is controlled to regulate the amount of exhaust gas in accordance with a pressure value input from a pressure sensor adapted to detect the pressure value of a roasting space, such that a pressure value of a roasting space becomes a predetermined pressure value preset as a target value.

By this, the pressure value of the roasting space can be adjusted taking into consideration such factors as temperature, etc. of the combustion space, seasons and weather.

As a result, the pressure value of the roasting space can be finely adjusted without a high-degree of knowledge and experience. By adjusting the amount of exhaust gas by serving the target value as, for example, a particular pressure value in a particular roasting state, a particular roasting state of coffee beans can easily be reproduced without the knowledge and experience of a technician.

BRIEF DESCRIPTION OF THE DRAWINGS

FIGS. 1 through 3 show a first embodiment of the present invention, FIG. 1 is a schematic view showing the construction of a roasting device, FIG. 2 is a flowchart of control performed at the time a pressure value is recorded, and FIG. 3 is a flowchart of the exhaust gas at the time the amount of exhaust gas is controlled without respect to a particular recorded pressure value.

FIG. 4 is a schematic view showing the construction of a roasting device, and FIG. 5 is a flowchart at the time the amount of exhaust gas is controlled based on a preset particular pressure value.

DETAILED DESCRIPTION

The embodiments of the present invention will be described in detail with reference to the drawings.

Figure 1:
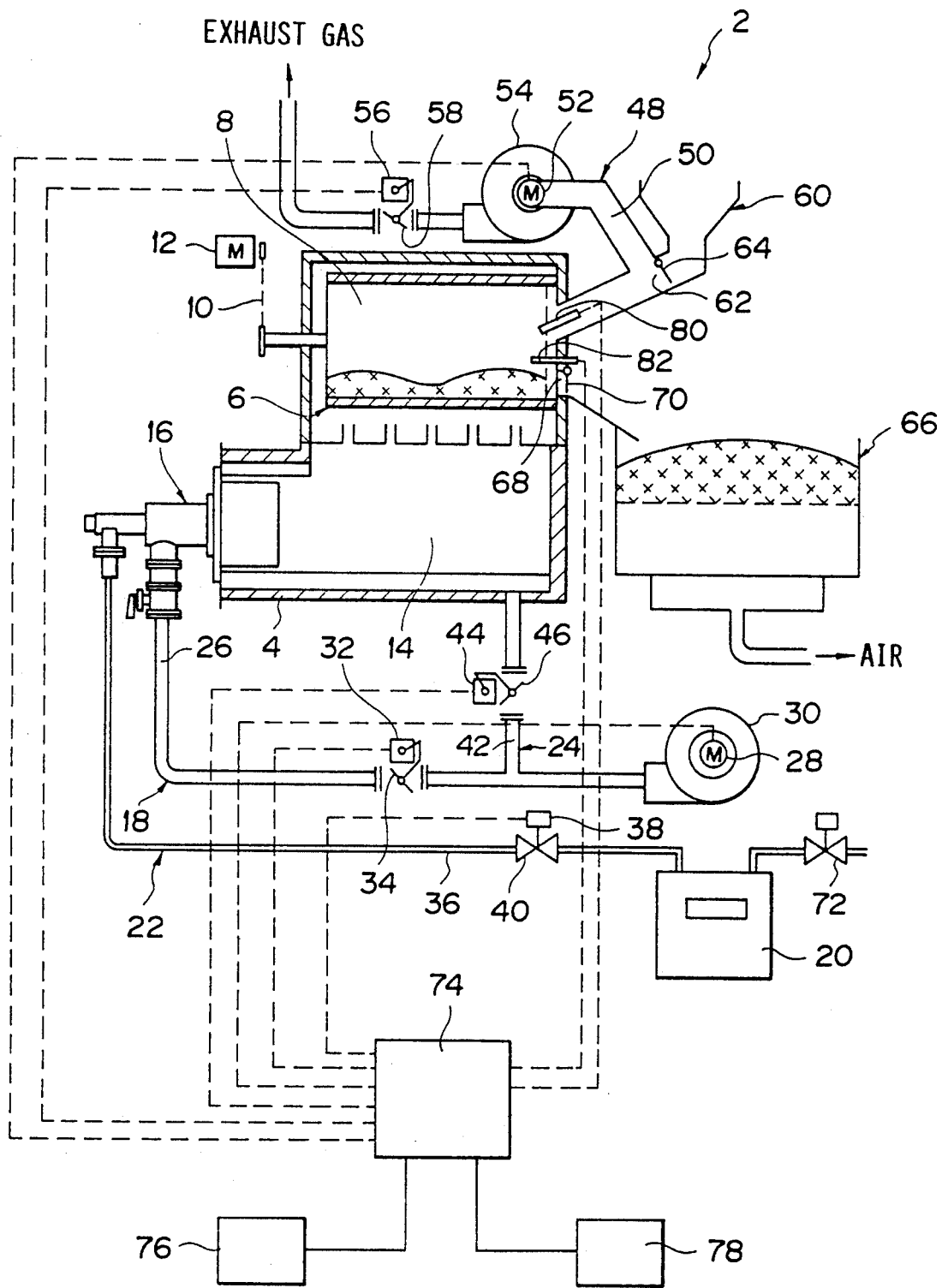

FIGS. 1 through 3 show a first embodiment of the present invention. In FIG. 1, the numeral 2 denotes a roasting device, 4 a body of the roasting device 2, and 6 a roasting container. The roasting container 6 is formed in a cylindrical shape having a roasting space 8 therein. This roasting container 6 is rotatably axially supported in a horizontal posture at an upper part of the interior of the body 4 and communicated with a roasting motor 12 through a chain 10 or the like. The roasting container 6 is rotated at a predetermined number of rotation by the roasting motor 12.

The body 4 of the roasting device 2 is provided therein and beneath the roasting container 6 with a hot air chamber 14. Hot air for roasting coffee beans is supplied to the hot air chamber 14 by hot air supplying means.

The hot air supplying means is provided with a burner 16 for generating hot air which is to be supplied into the hot air chamber 14. This burner 16 is communicated with a terminal end side of a combustion air pipe 18 which is released to the atmosphere at a starting end side thereof and also with a terminal end side of a fuel pipe 22 which is communicated at a starting side thereof with a fuel tank 20. A dilution air pipe 24 is communicated at a starting side thereof with an intermediate part of the combustion air pipe 18 and at a terminal end side thereof with the hot air chamber 14 in the body 4.

A combustion air passage 26 comprising the combustion air pipe 18 is provided with a combustion air fan 30 driven by a combustion air motor 28 and also with a combustion air damper 34 actuated by a combustion air actuator 32. A fuel passage 36 comprising the fuel pipe 22 is provided with a fuel regulating valve 40 actuated by a fuel regulating actuator 38. A dilution air passage 42 comprising the dilution air pipe 24 which is communicated at the starting end side with between the combustion air fan 30 and the combustion air damper 34 is provided with a dilution air damper 46 actuated by a dilution air actuator 44.

The combustion air motor 28, combustion air actuator 32, fuel regulating actuator 38 and dilution air actuator 44 are all connected to a control portion 74 as will be described later.

Exhaust air generated at the time the coffee beans are roasted by hot air supplied by the hot air supplying/discharging means is discharged outside by exhaust air discharging means.

The exhaust discharging means includes an exhaust pipe 48 which is connected at a starting end side thereof with the body 4 of the roasting device 2 and released at a terminal end side thereof to the atmosphere. An exhaust passage 50 comprising this exhaust pipe 48 is communicated at a starting end side thereof with the roasting space 8 and released at a terminal end side there to the atmosphere. Disposed to a terminal end side of this exhaust passage 50 are a dust arrester, a deodorizing device and the like, all of which are not illustrated. The exhaust passage 50 is provided with an exhaust fan 54 driven by an exhaust motor 52 to exert a drawing pressure to the roasting space 8 and also with an exhaust damper 58 disposed to a downstream side of the exhaust fan 54 and actuated by an exhaust actuator 56.

Hot air generated in the hot air chamber 14 by the burner 16 is caused to flow in the roasting space 8 by activation of the exhaust fan 54 and exhaust damper 58 driven by the exhaust motor 52 and exhaust actuator 56 which roast the coffee beans. Both of the exhaust motor 52 and the exhaust actuator 56 are connected to a control portion which will be described later.

The numeral 60 denotes an inlet hopper for inserting coffee beans therein. The inlet hopper 60 is communicated with an inlet port 62 disposed to the exhaust passage on the upstream side from the exhaust fan 54. An inlet cover 64 is disposed to the inlet port 62 such that the cover 64 can be opened and closed. The numeral 66 denotes a container for taking out coffee beans already roasted. The take-out container 66 is disposed beneath an outlet port 68 formed at a part of the body 4 communicated with the roasting space 8. An outlet port cover 70 is disposed to the outlet port 68 such that the outlet port cover 70 can be opened and closed. The take-out container 66 is adapted to cool the taken-out roasted coffee beans to remove heat therefrom. For example, by drawing and discharging air from a lower part of the take-out container 66 by a cooling fan driven by an unshown cooling motor, the coffee beans are cooled. Furthermore, the numeral 72 denotes a filling valve which is opened when fuel is filled in the fuel tank 20.

The control portion 74 connected by all of the combustion air motor 28, combustion air actuator 32, fuel regulating actuator 38, dilution air actuator 44, exhaust motor 52 and exhaust actuator 56 is electronically constructed. This control portion 74 is connected with a record portion 76 for recording detection values detected by sensors 80, 82 as will be described later, target values for controlling, etc., and with an operating portion 78 for inputting information on the controlling steps for roasting the coffee beans, target values for controlling, etc.

The control portion 74 is connected with a pressure sensor 80 and a temperature sensor 82 as detection means for detecting factors exerting influence upon the roasting state of the coffee beans. The pressure sensor 80 is disposed in such a manner as to be faced with the roasting space 8 at the part communicated with the starting end side of the exhaust passage 50 and adapted to detect a pressure value of the roasting space 8. The temperature sensor 82 is disposed in such a manner as to be faced with the roasting space 8 and adapted to detect a temperature value of the roasting space 8.

The control portion 74 is connected to pressure sensor 80 for detecting a pressure value of the roasting space 8 as a factor for exerting influence upon the roasting state of the coffee beans and adapted to record the pressure value of the roasting space 8 which is to be input from the pressure sensor 80 in a particular roasting state of the coffee beans and controls the number of revolution of the exhaust motor 52 of the exhaust discharging means, the opening degree of the exhaust actuator 56, the number of revolution of the exhaust motors for the dust arrester and deodorizing device not shown, and the opening degree of the exhaust actuator, etc. to regulate the amount of exhaust gas on a basis of the pressure value input from the pressure sensor 80 such that the pressure value of the roasting space 8 becomes the above-mentioned recorded particular pressure value as a target value.

In this first embodiment, the control portion 74 records the pressure value of the roasting space 8 detected by the pressure sensor 80 in a particular roasting state of the coffee beans as a particular roasting state to the record portion 76, and it inverter controls, through operation of the operating portion 78, the number of revolution of the exhaust motor 52 to actuate the exhaust fan 54 thereby to regulate the amount of exhaust gas such that the pressure value of the roasting space 8 becomes the particular pressure value by serving the above-mentioned recorded particular pressure value as a tracing control value. Furthermore, the control portion 74 controls, for example, the fuel regulating actuator 38 for actuating the fuel regulating valve 40 and the combustion air actuator for actuating the combustion air damper 34 of the hot air supplying means to regulate the amounts of fuel and air on a basis of a temperature value input from the temperature sensor 82 such that the temperature value of the hot air becomes a preset predetermined temperature value.

The control procedure of the first embodiment will now be described.

The recording procedure of the pressure value of the roasting space 8 in the roasting state of the coffee beans will be described first.

When recording, the temperature value and the pressure value of hot air which is supplied into the roasting space 8 are set to predetermined values by the control portion 78, and information on control steps (program) for controlling the combustion air motor 28, etc. of the hot air supplying means and the exhaust motor 52 of the exhaust discharging means such that the temperature and pressure become such predetermined temperature value and pressure value as mentioned above, is input.

As is shown in FIG. 2, upon start (100) of the controlling procedure, the control portion 74 inputs (102) a temperature value of the roasting space 8 detected by the temperature sensor 82 and controls the fuel regulating actuator 38, etc. to regulate (104) the amounts of fuel and air which are to be supplied to the burner 16, such that the temperature of hot air generated in the hot air chamber 14 becomes a predetermined temperature value on a basis of the above-mentioned temperature value in accordance with the steps which are input from the operating portion 78.

Then, in accordance with the steps input from the operating portion 78, the number of revolution of the exhaust motor 52 is inverter controlled to regulate (106) the amount of discharging exhaust gas, such that the pressure value of the roasting space 8 becomes the predetermined pressure value.

By this, hot air of a predetermined temperature value is flowed into the roasting space 8 from the hot air chamber 14 and the coffee beans are roasted by being contacted with such hot air.

Exhaust gas generated by the roasting of the coffee beans is discharged outside through the exhaust passage 50.

At that time, the pressure value of the roasting space 8 detected by the pressure sensor 80 during the roasting operation of the coffee beans is input (108) and recorded (110) to the record portion 76, thus ending (112) this procedure.

The recording of the pressure value in the roasting state of the coffee beans is continuously performed from the starting time of roasting the coffee beans to the ending time of the roasting and this is performed in accordance with various particular roasting states of the coffee beans. Accordingly, the recording of various particular pressure values corresponding to the respective particular roasting states is accumulated in the record portion 76.

Next, the roasting procedure of the coffee beans which is carried out in accordance with the above-mentioned recorded particular pressure values will be described.

At the time the coffee beans are roasted in accordance with the above-mentioned recorded particular pressure values, and information on the control steps of selecting a particular pressure value in a particular roasting state of coffee beans to be reproduced from the record of the particular pressure values corresponding to the respective particular roasting states accumulated in the record portion 76 and inverter controlling the number of revolution of the exhaust motor 52 to regulate the amount of exhaust gas such that the pressure value of the roasting space 8 becomes such selected particular pressure value by serving such particular pressure value as a tracing control value, is input by the operation of the operating portion 78.

As is shown in FIG. 3, upon start (200) of the controlling procedure, the control portion 74 inputs (102) a temperature value of the roasting space 8 detected by the temperature sensor 82 and controls the fuel regulating actuator 38, etc. to regulate (104) the amounts of fuel and air which are to be supplied to the burner 16 on a basis of the above-mentioned temperature value in accordance with the steps, information of which is input from the operating portion 78, such that the temperature of hot air generated in the hot air chamber 14 becomes a predetermined temperature value.

Then, the pressure value of the roasting space 8 detected by the pressure sensor 80 is input (206) and in accordance with the steps input from the operating portion 78, the number of revolution of the exhaust motor 52 is inverter controlled to regulate (106) the amount of discharging exhaust gas by serving the particular pressure value recorded in the record portion 76 as a tracing control value, such that the pressure value of the roasting space 8 input from the pressure sensor 80 becomes the predetermined pressure value.

The regulation of the amount of exhaust gas is performed until the control steps input by the operating portion 78 are completed (210) and then ended (212).

By this, hot air of a predetermined temperature is supplied into the roasting space 8 from the hot air chamber 14, and the coffee beans are roasted by being contacted with such hot air. By regulating the amount of exhaust gas such that the pressure value of the roasting space 8 during the roasting of the coffee beans becomes the predetermined pressure value input from the operating portion 78, the coffee beans are roasted into a particular roasting state.

In this way, by inverter controlling the number of revolution of the exhaust motor 52 to regulate the amount of exhaust gas such that the pressure value of the roasting space 8 becomes the predetermined pressure value, the fine regulation of the amount of exhaust gas is no more difficult as in the opening and closing operation of the passage by the conventional exhaust damper and there can be prevented the amount of exhaust gas from being changed due to affection of such factors as temperature, etc. of the combustion space 8, seasons, weather and the like. Furthermore, there can be avoided such inconveniences as that the amount of exhaust gas is fluctuated by the dust arrester, deodorizing device, etc., and the pressure value of the roasting space can be regulated to a desired value.

As a result, the pressure value of the roasting space 8 can be finely regulated without any requirement of high-degree of knowledge and experience. As a consequence, by inverter controlling the number of revolution of the exhaust motor 52 to regulate the amount of exhaust gas by serving the particular pressure value in the above-mentioned recorded particular roasting state of the coffee beans as a tracing control value such that the pressure value of the roasting space 8 becomes the particular pressure value, the coffee beans can be roasted into the particular roasting state and the particular roasting state of the coffee beans can easily be reproduced without depending on the knowledge and experience of a technician.

In this first embodiment, although the number of revolution of the exhaust motor 52 constituting the exhaust gas discharging means is controlled to regulate the amount of exhaust gas, such that the pressure value of the roasting space 8 becomes a target value, it may be designed such that the opening degree of the exhaust actuator 56, the number of revolution of the exhaust motor and the opening degree, etc. of the exhaust actuator of the dust arrester and deodorizing device are controlled to regulate the amount of exhaust gas.

Alternatively, it is possible to design such that an exclusive-use regulation passage for regulating the amount of exhaust gas is provided, the regulation passage being provided with a regulation fan driven by a regulation motor, a regulation damper actuated by a regulation actuator, etc., the regulation motor and regulation actuator being controlled to regulate the amount of exhaust gas such that the pressure value of the roasting space 8 becomes a target value.

Furthermore, it is possible to design such that the number of revolution of the combustion air motor 28 and the opening degree of the combustion air actuator 32, both of which constitute the hot air supplying means, are controlled to regulate the supplying amount of hot air.

Furthermore, it is also possible to design such that by utilizing a vent fan driven by a vent motor, a vent damper actuated by a vent actuator, both of which are disposed to a passage constituting the above-mentioned exhaust discharging means and other vent means that the hot air supplying means, the vent motor and vent actuator are controlled to regulate the amount of exhaust air, such that the pressure value of the roasting space 8 becomes a target value.

Figure 4:
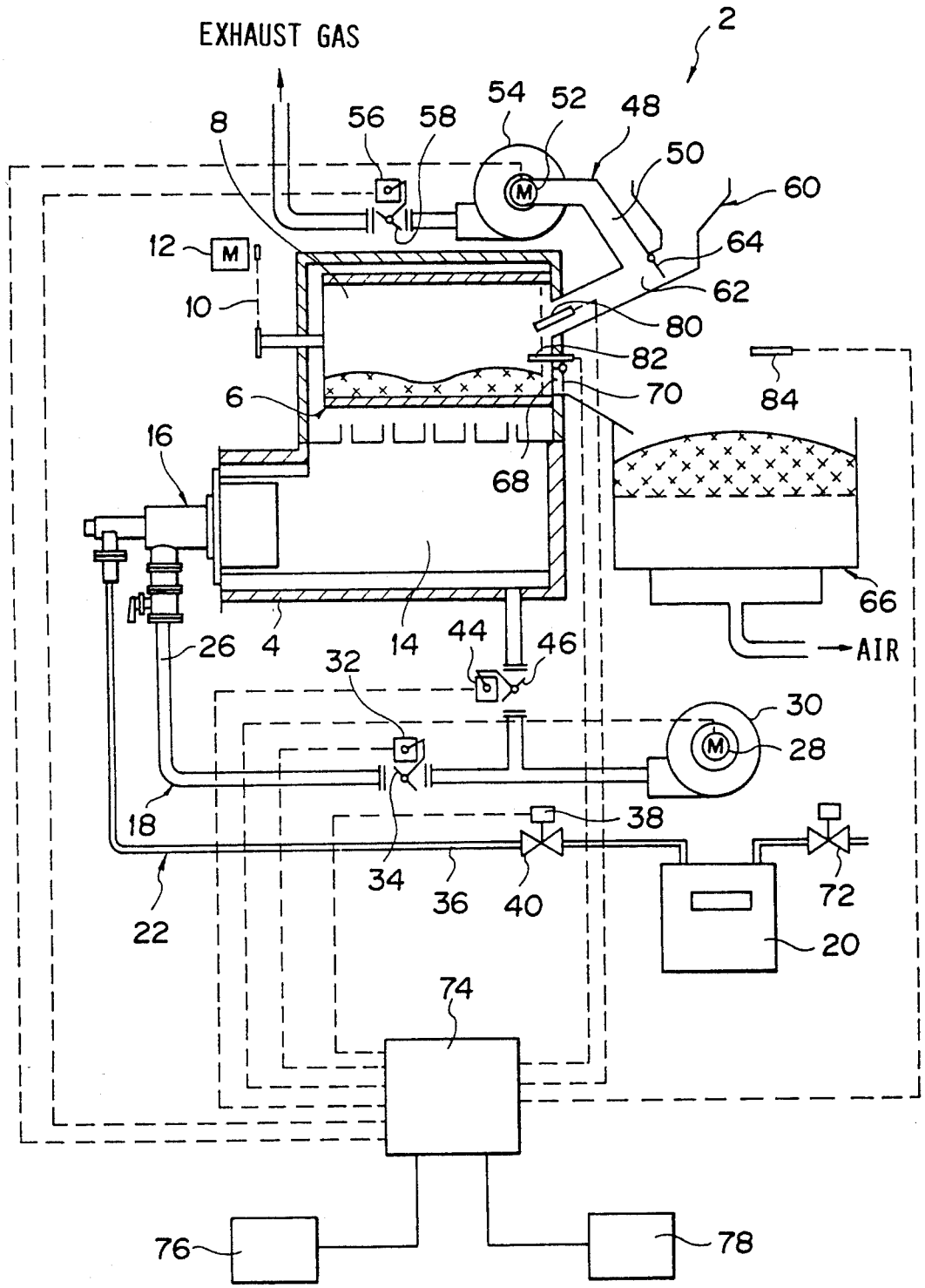
FIGS. 4 and 5 show a second embodiment of the present invention.
Figure 5:
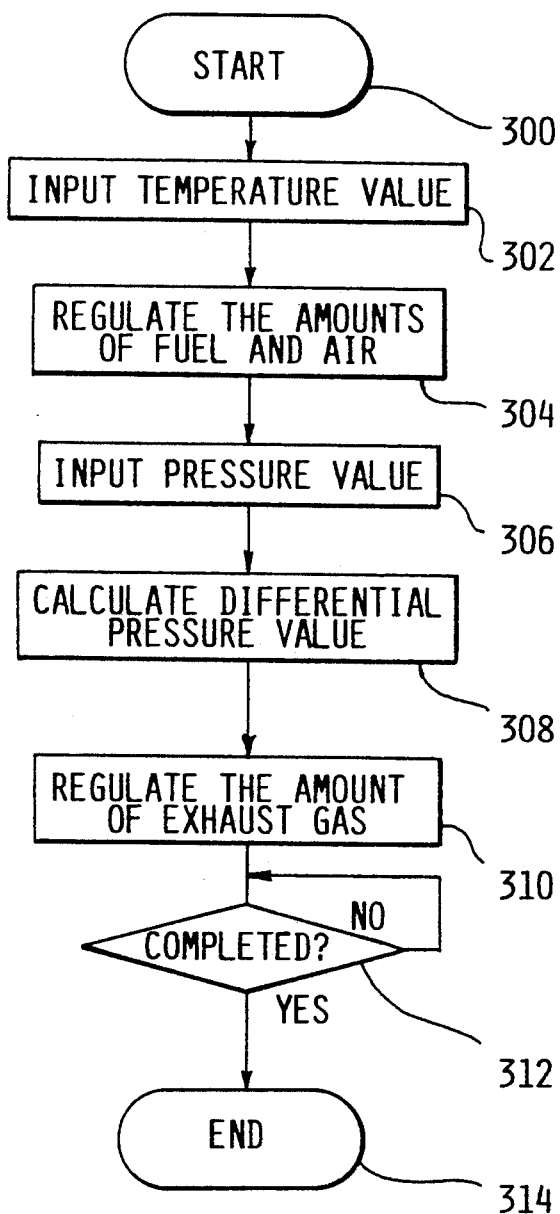

FIGS. 4 and 5 show a second embodiment of the present invention. In FIG. 4, the parts functioning in the same way as those of FIG. 1 are denoted by identical reference numerals, and detailed description thereof will be omitted.

The roasting device 2 shown in this second embodiment comprises a control portion 74, the control portion 74 being connected with a combustion air motor 28, a combustion air actuator 32, a fuel regulating actuator 38, a dilution air actuator 44, an exhaust motor 52 and an exhaust actuator 56. The control portion 74 is further connected with a record portion 76 for recording detection values detected by various sensors 80 through 84 which will be described afterward, target values for controlling, etc., and an operating portion 78 for inputting the controlling steps of roasting the coffee beans and target values for controlling, etc..

Also, the control portion 74 is further connected with pressure sensors 80, 84 and a temperature sensor 82 as detection means for detecting factors exerting influence upon the roasting state of the coffee beans.

The pressure sensor 80 is disposed in such a manner as to be faced with the roasting space 8 at a part communicated with a starting end side of the exhaust passage 50 and adapted to detect a pressure value of the roasting space 8. The temperature sensor 82 is disposed in such a manner as to be faced with the roasting space 8 and adapted to detect the temperature value of the roasting space 8. The other pressure sensor 84 is disposed in such a manner as to be close to the roasting device 2 and adapted to detect a pressure value around the roasting device 2.

The control portion 74 is provided with the pressure sensors 80, 84 for detecting the pressure value of the roasting space 8 and the pressure value around the roasting device 2 as factors exerting influence upon the roasting state of the coffee beans, and based on the pressure values from the pressure sensors 80, 84, the control portion 74 controls the number of revolution of the exhaust motor 52 and the opening degree of the exhaust actuator 56 of the exhaust discharging means, and it also controls the number of revolution of an exhaust motor, the opening degree, etc. of an exhaust actuator of unshown dust arrester and deodorizing device to regulate the amount of exhaust gas, such that a differential pressure value between the pressure value of the roasting space 2 and the pressure value around the roasting device 8 becomes a predetermined differential pressure value preset as a target value.

In this second embodiment, the control portion 74 inverter controls the number of revolution of the exhaust motor 52 to actuate the exhaust fan 54, thereby to regulate the amount of exhaust gas such that the differential pressure value between the pressure value of the roasting space 8 and the pressure value around the roasting device 2 becomes a predetermined differential value preset as a target value. Furthermore, the control portion 74 controls, for example, the fuel regulating actuator 38 for actuating the fuel regulating value 40 and the combustion air actuator 32 for actuating the combustion air damper 34 as the afore-mentioned hot air supplying means to regulate the amounts of fuel and air on a basis of a temperature value input from the temperature sensor 82 such that the temperature value of the hot air becomes a preset predetermined temperature value.

Next, the control procedure of the second embodiment will be described.

When roasting, by the operating portion 78, the temperature value of the hot air supplied to the roasting space 8 and the differential pressure value are set to predetermined values and the information on the control steps (program) for controlling the combustion air motor 28, etc. of the hot air supplying means and the exhaust air motor 52 of the exhaust discharging means such that they become the predetermined temperature value and differential pressure value is input.

As is shown in FIG. 5, upon start (300) of the controlling procedure, the control portion 74 inputs (302) a temperature value of the roasting space 8 detected by the temperature sensor 82 and controls the fuel regulating actuator 38, etc. to regulate (304) the amounts of fuel and air which are to be supplied to the burner 16 on a basis of the above-mentioned temperature value in accordance with the steps, such that the temperature of hot air generated in the hot air chamber 14 becomes a predetermined temperature value, information of which is input from the operating portion 78.

Then, in accordance with the steps input from the operating portion 78, the pressure value of the roasting space 8 detected by the pressure sensor 80 and the pressure value around the roasting device 2 detected by the pressure sensor 84 are input (306), a differential pressure value is calculated (308) from the pressure value of the roasting space 8 input from the pressure sensors 80, 84 and the pressure value around the roasting device 2 and the number of revolution of the exhaust motor 52 is controlled to regulate (310) the amount of discharging exhaust gas, such that such calculated differential pressure value becomes a predetermined differential pressure value preset as a target value.

The regulation of the amount of exhaust gas is performed until the control steps input by the operating portion 78 are completed (312) and then ended (314).

By this, hot air of a predetermined temperature is supplied into the roasting space 8 from the hot air chamber 14, and the coffee beans are roasted by being contacted with such hot air. Exhaust gas generated by roasting of the coffee beans is discharged outside by the exhaust passage 50. At this time, by regulating the amount of exhaust gas such that the pressure value of the roasting space 8 during the roasting of the coffee beans becomes the predetermined differential pressure value in a particular roasting state input from the operating portion 78, the coffee beans can be roasted into the particular roasting state.

In this way, by inverter controlling the number of revolution of the exhaust motor 52 to regulate the amount of exhaust gas such that the differential pressure value between the pressure value of the roasting space 8 and the pressure value around the roasting device 2 becomes a predetermined differential pressure value preset as a target value, it can be regulated to a desired pressure value as in the first embodiment.

As a result, the pressure value of the roasting space 8 can be finely regulated into a particular pressure value in a particular roasting state of the coffee beans without any requirement of high-degree of knowledge and experience. As a consequence, by regulating the amount of exhaust gas such that the differential pressure value between the pressure value of the roasting space 8 and the pressure value around the roasting device 2 becomes a predetermined differential pressure value preset as a target value, the coffee beans can be roasted into the particular roasting state and the particular roasting state of the coffee beans can easily be reproduced without depending on the knowledge and experience of a technician.

Figure 6:
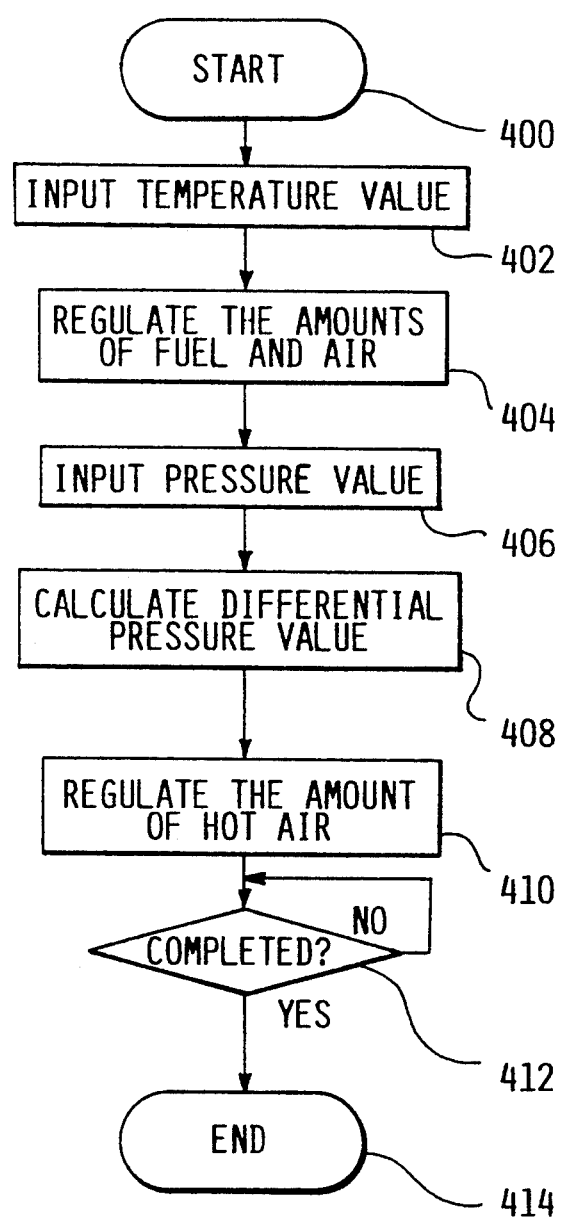
FIG. 6 is a flowchart at the time the amount of hot air is controlled based on a preset particular pressure value.

FIG. 6 shows a third embodiment of the present invention. Since the construction of this third embodiment is the same to that of the second embodiment shown in FIG. 4, the construction of the third embodiment will be described with reference to FIG. 4.

The roasting device 2 shown in this third embodiment comprises a control portion 74, the control portion 74, as shown in FIG. 4, being connected with a combustion air motor 28, a combustion air actuator 32, a fuel regulating actuator 38, a dilution air actuator 44, an exhaust motor 52 and an exhaust actuator 56, the control portion 74 being connected with a record portion 76 for recording detection values detected by various sensors 80 through 84 as will be described later, a target value for controlling, etc., and an operating portion 78 for inputting the control steps for roasting the coffee beans, a target value for controlling, etc..

The control portion 74 is connected with a pressure sensors 80, 84 and a temperature sensor 82 as detection means for detecting factors exerting influence upon the roasting state of the coffee beans.

The pressure sensor 80 is disposed in such a manner as to be faced with the roasting space 8 at the part communicated with the starting end side of the exhaust passage 50 and adapted to detect a pressure value of the roasting space 8. The temperature sensor 82 is disposed in such a manner as to be faced with the roasting space 8 and adapted to detect a temperature value of the roasting space 8. The other pressure sensor 84 is disposed in such a manner as to be close to the roasting device 2 and adapted to detect a pressure value around the roasting device 2.

The control portion 74 is provided with the pressure sensors 80, 84 for detecting the pressure value of the roasting space 8 and the pressure value around the roasting device 2 as factors exerting influence upon the roasting state of the coffee beans, and based on the pressure values from the pressure sensors 80, 84, the control portion 74 controls the number of revolution of the combustion air motor 28 and the opening degree of the combustion air actuator 32, the opening degree of the dilution air actuator 44, etc. of the hot air supplying means to regulate the amount of exhaust gas, such that a differential pressure value between the pressure value of the roasting space 8 and the pressure value around the roasting device 8 becomes a predetermined differential pressure value preset as a target value.

In this third embodiment, the control portion 74, as shown in FIG. 6, inverter controls the number of revolution of the combustion air motor 28 such the differential pressure value between the pressure value of the roasting space 8 and the pressure value around the roasting device 2 becomes a preset differential value as a target value to actuate the combustion air fan 30, thereby to regulate the amount of hot air. Furthermore, the control portion 74 controls the fuel regulating actuator 38 for actuating the fuel regulating value 40 and the combustion air actuator 32 for actuating the combustion air damper 34 of the afore-mentioned hot air supplying means on a basis of a temperature value input from the temperature sensor 82 to regulate the amounts of fuel and air, such that the temperature value of the hot air becomes a preset predetermined temperature value.

Next, the control procedure of the third embodiment will be described.

When roasting, by the operating portion 78, the temperature value of the hot air supplied to the roasting space 8 and the differential pressure value are set to predetermined values and the information on the control steps (program) for controlling the combustion air motor 28, etc. of the hot air supplying means and the exhaust air motor 52, etc. of the exhaust discharging means such that they become the predetermined temperature value and differential pressure value is input.

As is shown in FIG. 6, upon start (400) of the controlling procedure, the control portion 74 inputs (402) a temperature value of the roasting space 8 detected by the temperature sensor 82 and controls the fuel regulating actuator 38, etc., in order to regulate (404) the amounts of fuel and air which are to be supplied to the burner 16, such that the temperature of hot air generated in the hot air chamber 14 becomes a predetermined temperature value on a basis of the above-mentioned temperature value in accordance with the steps, information of which is input from the operating portion 78.

Then, in accordance with the steps input from the operating portion 78, the pressure value of the roasting space 8 detected by the pressure sensor 80 and the pressure value around the roasting device 2 detected by the pressure sensor 84 are input (406), a differential pressure value is calculated (408) from the pressure value of the roasting space 8 input from the pressure sensors 80, 84 and the pressure value around the roasting device 2 and the number of revolution of the combustion air motor 28 is controlled, in order to regulate (410) the amount of hot air, such that such calculated differential pressure value becomes a predetermined differential pressure value preset as a target value.

The regulation of the amount of hot air is performed until the control steps input by the operating portion 78 are completed (412) and then ended (414).

By this, hot air of a predetermined temperature is supplied into the roasting space 8 from the hot air chamber 14, and the coffee beans are roasted by being contacted with such hot air. Exhaust gas generated by roasting of the coffee beans is discharged outside by the exhaust passage 50. At this time, by regulating the amount of exhaust gas such that the differential pressure value of the roasting space 8 during the roasting of the coffee beans becomes the predetermined differential pressure value in a particular roasting state input from the operating portion 78, the coffee beans can be roasted into the particular roasting state.

In this way, by inverter controlling the number of revolution of the combustion air motor 52 to regulate the amount of hot air such that the differential pressure value between the pressure value of the roasting space 8 and the pressure value around the roasting device 2 becomes a predetermined differential pressure value preset as a target value, it can be regulated to a desired pressure value as in the first and second embodiments.

As a result, the pressure value of the roasting space 8 can be finely regulated into a particular pressure value in the particular roasting state of the coffee beans without any requirement of high-degree of knowledge and experience. As a consequence, by regulating the amount of exhaust gas such that the differential pressure value between the pressure value of the roasting space 8 and the pressure value around the roasting device 2 becomes a predetermined differential pressure value preset as a target value, the coffee beans can be roasted into the particular roasting state and the particular roasting state of the coffee beans can easily be reproduced without depending on the knowledge and experience of a technician.

In this third embodiment, the control portion 74 inverter controls the number of revolution of the combustion air motor 28 to regulate the amount of hot air such that the differential pressure value between the pressure value of the roasting space 8 and the pressure value around the roasting device 2 becomes a predetermined differential value preset as a target value. Alternatively, it may be designed such that the amount of hot air is regulated by controlling, for example, the opening degree of the combustion air actuator 32, the opening degree of the fuel regulating actuator 38 and the opening degree of the dilution air actuator 44.

Figure 7:
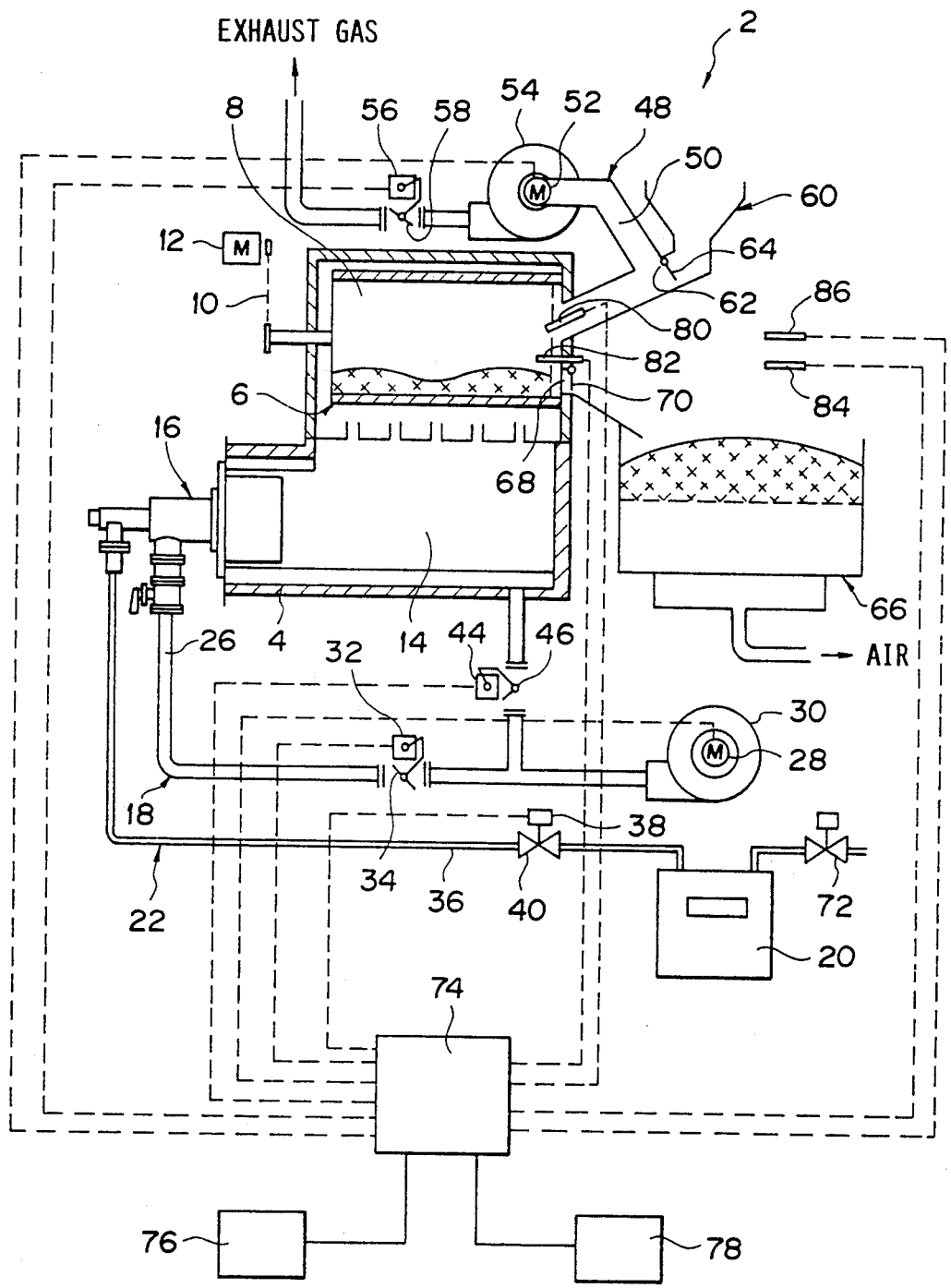
FIG. 7 is a schematic view showing the construction of a roasting device according to another embodiment of the present invention.

Also, in the above-mentioned embodiments, the amount of exhaust gas and the amount of hot air are regulated on a basis of a pressure value detected by the pressure sensor. Alternatively, it may be designed to include, as shown in FIG. 7, pressure sensors 80, 84 for detecting a pressure value of the roasting space 8 and a pressure value around the roasting device 2 and temperature sensors 82, 86 for detecting a temperature value of the roasting space 8 and a temperature value around the roasting device 2 as detection means for detecting factors exerting influence upon the roasting state of the coffee beans, the exhaust discharging means such as the exhaust motor 52, the exhaust actuator 56, etc. being controlled to regulate the amount of exhaust gas on a basis of the pressure values input from the pressure sensors 80, 84, the hot air supplying means such as the fuel regulating actuator 38, the combustion air motor 28, etc. being controlled to regulate the temperature value of hot air on a basis of temperature values input from the temperature sensors 82, 86, thereby to regulate such that the pressure value of the roasting space becomes a predetermined pressure value preset as a target value.

As another mode for regulating the temperature value of hot air by the control of the hot air supplying means, it may be regulated by controlling the combustion and/or extinction (actuation and/or stop) of the burner 16 through an ignition device. In addition, the temperature value of hot air can be regulated by jetting, spraying, circulating a cooling material comprising such fluid as water, air, and the like.

POSSIBILITY OF INDUSTRIAL UTILIZATION

As described in the foregoing, a coffee bean roasting device according to the present invention is designed such that even a non-technician can easily roast the coffee beans into a desired roasting state without any requirement of high-degree of knowledge and experience.

I claim:

1. In a coffee roasting device having a roasting space in a roasting container for receiving coffee beans, and hot air supplying means and exhaust gas discharging means communicating with said roasting space, the improvement comprising:

temperature and pressure detecting means for detecting temperature and pressure conditions in the roasting space which influence a roasting state of the coffee beans, said temperature and pressure detecting means including means for supplying detection signals;

control means for controlling at least one of said hot air supplying means and said exhaust gas discharging means in response to a present detection signal; and recording means for recording and accumulating detection signals from previous roasting states of the coffee beans;

said control means including means for selecting a previous detection signal from the recorded detection signals, said previous detection signal corresponding to a desired roasting state to be reproduced, said control means including means for causing said present detection signal to equal said previous detection signal thereby causing said coffee beans to be roasted into the desired roasting state.

2. A device according to claim 1 wherein said control means is an electronic control unit, said electronic control unit including means responsive to a pressure sensor of said temperature and pressure detecting means, said pressure sensor is adapted to detect a pressure value of said roasting space, said present detection signal representing said pressure value, said electronic control unit including means for controlling said exhaust gas discharging means in response to said present detection signal which becomes equal to said previous detection signal by adjusting the amount of exhaust gas allowed to escape via the exhaust gas discharging means.

3. A device according to claim 1, wherein said control means is an electronic control unit, said electronic control unit including means responsive to a pressure value of the roasting space and a pressure value outside the roasting device as conditions which influence the roasting state of the coffee beans, said electronic control unit including means responsive to a current difference pressure value between said pressure value of the roasting space and said pressure value outside the roasting device;

said recording means including means for recording and accumulating difference pressure values from previous roasting states of the coffee beans;

said electronic control unit including means for selecting a previous difference pressure value from the recorded difference pressure values, said electronic control unit including means for causing said current difference pressure value to equal said previous difference pressure value thereby causing said coffee beans to be roasted into the desired roasting state, said electronic control unit including means for controlling said exhaust gas discharging means in response to said current difference pressure value which is caused to become equal to said previous difference pressure value by adjusting the amount of exhaust gas allowed to escape via the exhaust gas discharging means.

4. A device according to claim 1, wherein said control means is an electronic control unit, said electronic control unit including means responsive to a pressure value of the roasting space and a pressure value outside the roasting device as conditions which influence the roasting state of the coffee beans, said electronic control unit including means responsive to a current difference pressure value between said pressure value of the roasting space and said pressure value outside the roasting device;

said recording means including means for recording and accumulating difference pressures from previous roasting states of the coffee beans;

said electronic control unit including means for selecting a previous difference pressure value from the recorded difference pressure values, said electronic control unit including means for causing said current difference pressure value to equal said previous difference pressure value thereby causing said coffee beans to be roasted into the desired roasting state. said electronic control unit including means for controlling said hot air supplying means in response to said current difference pressure value which is caused to become equal to previous difference pressure value by adjusting the amount hot air supplied to said roasting space.

5. In a coffee bean roasting device for roasting coffee beans having a roasting space for receiving coffee beans in a roasting container, a heat supplying means for supplying heat to the roasting space, and an exhaust gas discharging means for discharging exhaust gas from the roasting space, the improvement comprising:

a first pressure sensor for sensing pressure values within said roasting space;

a temperature sensor for sensing temperature values within said roasting space;

control means for receiving said pressure and temperature values;

recording means for recording and accumulating pressure values from previous roasting states of the coffee beans; and said control means including means for selecting a previous pressure value from the recorded pressure values and means for controlling the exhaust discharging means in response to a current pressure value from within the roasting space so that the current pressure value substantially equals the previous pressure value.

6. A device according to claim 5, wherein said control means is an electronic control unit.

7. A device according to claim 5, further comprising a second pressure sensor for sensing pressure values outside said roasting space, and wherein said control means is an electronic control unit including means responsive to said current pressure value from within the roasting space and a pressure value outside the roasting device as conditions which exert influences on the roasting state of the coffee beans, said electronic control unit including means responsive to difference pressure values between said current pressure value from within the roasting space and said pressure value outside the roasting device;

said recording means including means for recording and accumulating difference pressure values from previous roasting states of the coffee beans;

said electronic control unit including means for selecting a previous difference pressure value from the recorded difference pressure values, said electronic control unit including means for causing a current difference pressure value to equal said previous difference pressure value thereby causing said coffee beans to be roasted into the desired roasting state, said electronic control unit including means for controlling said exhaust gas discharging means in response to said current difference pressure value which is caused to become equal to said previous difference pressure value by adjusting the amount of exhaust gas allowed to escape via the exhaust gas discharging means.

8. A device according to claim 5, further comprising a second pressure sensor for sensing pressure values outside said roasting device, and wherein said control means is an electronic control unit, said electronic control unit including means responsive to said current pressure value from within the roasting space and a pressure value outside the roasting device as conditions which exert influences on the roasting state of the coffee beans, said electronic control unit including means responsive to difference pressure values between said current pressure value from within the roasting space and said pressure value outside the roasting device;

said recording means including means for recording and accumulating difference pressures from previous roasting states of the coffee beans;

said electronic control unit including means for selecting a previous difference pressure value from the recorded difference pressure values, said electronic control unit including means for causing a current difference pressure value to equal said previous difference pressure value thereby causing said coffee beans to be roasted into the desired roasting state, said electronic control unit including means for controlling said heat supplying means in response to said current difference pressure which is caused to become equal to previous difference pressure value by adjusting the amount hot air supplied to said roasting space.

* * * * *

UNITED STATES PATENT AND TRADEMARK OFFICE
CERTIFICATE OF CORRECTION

PATENT NO. : 5 257 574
DATED : November 2, 1993
INVENTOR(S) : Hiromichi Toriba

It is certified that error appears in the above-indentified patent and that said Letters Patent is hereby corrected as shown below:

On the title page, under item [19], change "Hiromichi" to --Toriba-- and item [76], change "Toriba Hiromichi" to --Hiromichi Toriba--

Column 14, lines 32-34 should read: ---roasting state, said electronic control unit including means for controlling said hot air supplying means in response to said current difference pressure---.

Signed and Sealed this

Thirty-first Day of May, 1994

*Attest:*

BRUCE LEHMAN

*Attesting Officer*     *Commissioner of Patents and Trademarks*